United States Patent [19]

Harvey

[11] Patent Number: 4,496,212
[45] Date of Patent: Jan. 29, 1985

[54] DEAD END FITTING FOR USE IN OVERHEAD ELECTRIC AND OPTICAL TRANSMISSION SYSTEMS

[75] Inventor: Peter Harvey, London, England

[73] Assignee: BICC Public Limited Company, London, England

[21] Appl. No.: 466,742

[22] Filed: Feb. 15, 1983

[30] Foreign Application Priority Data

Feb. 18, 1982 [GB] United Kingdom ............... 8204766

[51] Int. Cl.³ ........................... G02B 7/26; H02G 7/00
[52] U.S. Cl. .............................. 350/96.20; 174/40 R; 174/79
[58] Field of Search ............... 174/40 R, 79, 90, 94 R, 174/43; 24/115 R, 115 A; 248/63; 339/276 D; 350/96.20, 96.23

[56] References Cited

U.S. PATENT DOCUMENTS

| 2,446,542 | 8/1948 | MacInnes | 339/276 D X |
| 2,879,321 | 3/1959 | Nilsson | 174/79 |
| 2,902,537 | 9/1959 | Salvi | 174/79 |

*Primary Examiner*—Laramie E. Askin
*Attorney, Agent, or Firm*—Buell Ziesenheim, Beck & Alstadt

[57] ABSTRACT

A simple and inexpensive dead end fitting for securing an overhead conductor loosely housing an optical guide to a tower comprises a sleeve of malleable metal or metal alloy, open at each of its ends, for compression jointing to the conductor; a steel termination in screw threaded engagement with the sleeve and having a clevis for securing the fitting to a tower; and a lug welded to the sleeve for effecting electrical connection to a jumper cable. The lug engages in a notch in the adjacent end of the termination to lock positively the screw threaded engagement between the sleeve and termination.

7 Claims, 1 Drawing Figure

U.S. Patent     Jan. 29, 1985     4,496,212
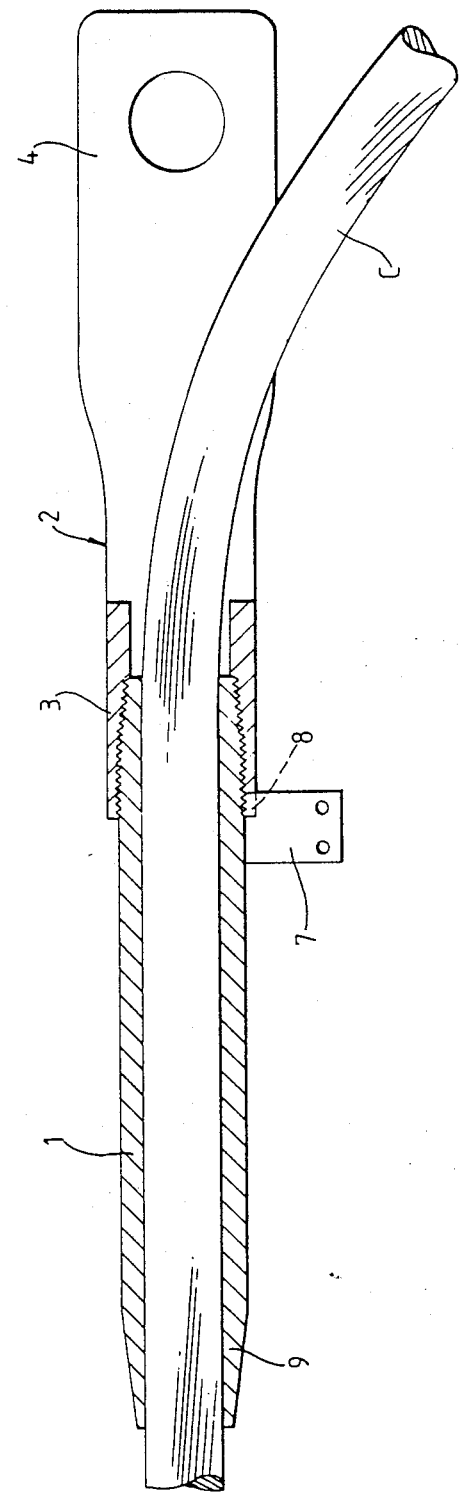

DEAD END FITTING FOR USE IN OVERHEAD ELECTRIC AND OPTICAL TRANSMISSION SYSTEMS

This invention relates to overhead electric and optical transmission systems of the kind in which one or more than one overhead electric conductor is freely supported in long lengths between towers, pylons, masts or other upstanding supports mutually spaced along the system, all such supports, for convenience, being included in the generic term "tower", and in which the overhead electric conductor, or at least one of the overhead electric conductors, includes at least one optical guide for use in the communications field adapted for transmission of light and comprises a substantially circumferentially rigid central core having an elongate compartment within and extending throughout the length of the core, at least one separate optical fibre and/or at least one optical bundle loosely housed in the elongate compartment and, surrounding the central core, at least one layer of helically wound bare elongate elements of metal or metal alloy.

By the expression "optical bundle" is meant a group of optical fibres or a group of fibres including at least one optical fibre and including at least one non-optical reinforcing fibre or other reinforcing elongate member. Such an overhead electric conductor is described and claimed in the Complete Specification of our British Pat. No. 1,598,438.

An overhead electric and optical transmisson system of the aforesaid kind in which the overhead electric conductor, or at least one of the overhead electric conductors, has, loosely housed in an elongate compartment in a central core, at least one separate optical fibre and/or optical bundle for the transmission of light, will hereinafter, for convenience, be referred to as "an overhead electric and optical transmission system of the kind described".

In an overhead electric and optical transmission system of the kind described, it is usually necessary at each of some of the towers along the system to effect a joint between the optical fibres and/or bundles of two overhead electric conductors suspended from the tower or between the optical fibres and/or bundles of an overhead electric conductor suspended from the tower and of a cable extending to a sub-station or other location. Optical guide joints of this kind are the subject of copending British patent application Nos. 2083647A and 2101351A.

In an optical guide joint of this kind, the end of the or each overhead electric conductor is mechanically secured to the tower through at least one electric insulator by means of a fitting generally and hereinafter referred to as a "dead end fitting".

It is an object of the present invention to provide an improved dead end fitting for connection to an end of an overhead electric conductor having, within a substantially circumferentially rigid central core, an elongate compartment in which is loosely housed at least one separate optical fibre and/or at least one optical bundle.

According to the invention, the improved dead end fitting comprises a sleeve of malleable metal or metal alloy, open at each of its ends, for compression jointing to an overhead electric conductor; means for securing the fitting to a tower or other support, which securing means is integral with or mechanically secured to one end of the sleeve in such a way that access to said open end of the sleeve is not impeded; and means integral with or secured to the sleeve for effecting electrical connection to an electric jumper cable.

The means for securing the fitting to a tower or other support is preferably separately formed with respect to the sleeve and preferably comprises a termination of steel or other metal or metal alloy of high mechanical strength which, over a part of its length at one of its ends, is of generally tubular form and is in screw threaded engagement with an end of the sleeve and which, at the other of its ends, is in the form of a clevis. Preferably, means is provided for positively locking the screw threaded engagement between the sleeve and termination.

In the preferred embodiment, one end part of the sleeve is externally screw threaded and the tubular part of the termination is internally screw threaded, the externally screw threaded end part of the sleeve and the internally screw threaded tubular part of the termination each being tapered over at least a part of its length so that the sleeve and termination are locked together under high torque on assembly.

The means for effecting electrical connection of the sleeve to an electric jumper cable preferably comprises a separately formed lug which is welded or otherwise permanently secured to the sleeve. Preferably, this lug is welded to the sleeve after the screw threaded connection between the sleeve and termination has been made and preferably, also, a part of the lug engages in a notch in the adjacent end of the termination to serve as the means positively locking the screw threaded engagement between the sleeve and termination.

In use, preferably before the sleeve is compression jointed to an overhead electric conductor, the conductor is coated with a grease containing silicon carbide or other particle filler to enhance the grip of the compressed sleeve on the conductor. The extent of the compressive force will be such that the central core of the overhead conductor is not so distorted that there is risk of damage to an optical fibre and/or optical bundle. Accordingly, compression jointing of the sleeve of the dead end fitting to an overhead conductor is effected preferably by means which imparts a controlled compressive force to the sleeve, e.g. an adjustable compression tool or explosive compression.

For corrosion protection, preferably the threads of the sleeve and of the tubular part of the termination are coated with grease before they are secured together.

The invention also includes an overhead electric and optical transmission system of the kind described in which the overhead electric conductor, or at least one of the overhead electric conductors, is mechanically secured to a tower through at least one electric insulator by means of the improved dead end fitting as hereinbefore described.

The accompanying diagrammatic drawing shows a side view of the preferred dead-end fitting, partly in section and partly in elevation, for use with an overhead electric conductor having, within a substantially circumferentially rigid central core, an elongate compartment in which is loosely housed at least one separate optical fibre and/or at least one optical bundle.

The invention will be further illustrated by a description, by way of example, of the preferred dead-end fitting with reference to the aforesaid drawing.

Referring to the drawing, the preferred dead end fitting comprises a sleeve 1 of aluminium alloy, open at each of its ends, and, separately formed with respect to and permanently secured to the sleeve, a termination 2 of steel. At one end 3 of the termination 2, the termination is of generally tubular form and at the other end 4 of the termination it is in the form of a clevis, one limb of which is seen in the drawing. The sleeve 1 and the tubular end 3 of the termination 2 are in screw threaded engagement, the threads having been greased before the sleeve and termination are screwed together. The externally screw threaded end part of the sleeve 1 and the internally screw threaded tubular end part 3 of the termination 2 are each tapered over at least a part of its length so that the sleeve and termination are locked together under high torque on assembly.

A separately formed lug 7 of aluminium alloy, for effecting electrical connection to a jumper cable, is welded to the sleeve 1 and a part of the lug engages in a notch 8 in the tubular end 3 of the termination 2 to lock positively the screw threaded engagement between the sleeve and the termination.

When the dead end fitting is to be permanently secured to an overhead electric conductor, the conductor C, with the part that is to lie within the sleeve 1 coated with a grease containing silicon carbide, is passed through the sleeve 1 so that it protrudes between the limbs of the clevis 4 and the sleeve is compression jointed to the conductor under a controlled compressive force, the end 9 of the sleeve remote from the termination 2 being tapered so that the compressive force imparted to the sleeve decreases smoothly in a direction towards the extremity of the sleeve, thereby substantially reducing risk of fracture of the conductor in service at the position where it enters the sleeve of the dead end fitting.

What I claim as my invention is:

1. A dead end fitting for connection to an end of an overhead electric conductor having, within a substantially circumferentially rigid central core, an elongate compartment in which is loosely housed at least one optical fibre, which dead end fitting comprises a sleeve of malleable metal or metal alloy, open at each of its ends, for compression jointing to an overhead electric conductor; a separately formed termination of metal or metal alloy of high mechanical strength which, over a part of its length at one of its ends, is of generally tubular form and is in screw threaded engagement with an end of the sleeve and which, at the other of its ends, is in the form of a clevis; and, for effecting electrical connection to an electric jumper cable, a separately formed lug which is permanently secured to the sleeve, a part of the lug engaging in a notch in the adjacent end of the termination to positively lock the screw threaded engagement between the sleeve and termination.

2. An overhead electric and optical transmission system of the kind in which at least one overhead electric conductor has, loosely housed in an elongate compartment in a central core, at least one optical fibre, in which system at least one said overhead electric conductor is mechanically secured to a tower through at least one electric insulator by means of a dead end fitting comprising a sleeve of malleable metal or metal alloy, open at each of its ends, and compression jointed at one end to the overhead electric conductor to such an extent that the central core of the overhead conductor is not so distorted that there is risk of damage to the or any optical fibre loosely housed in the elongate compartment in the central core; means at the other end of the sleeve securing the fitting to said electric insulator and of such a form that access to said other open end of the sleeve is not impeded; and means on the sleeve electrically connecting the sleeve to an electric cable.

3. An overhead electric and optical transmission system as claimed in claim 2, wherein the means securing the fitting to said electric insulator comprises a separately formed termination of metal or metal alloy of high mechanical strength which, over a part of its length at one of its ends, is of generally tubular form and is in screw threaded engagement with an end of the sleeve and which, at the other of its ends secured to said electric insulator is in the form of a clevis.

4. An overhead electric and optical transmission system as claimed in claim 3, wherein one end part of the sleeve is externally screw threaded and the tubular part of the termination is internally screw threaded, the externally screw threaded end part of the sleeve and the internally screw threaded tubular part of the termination each being tapered over at least a part of its length so that the sleeve and termination are locked together under high torque.

5. An overhead electric and optical transmission system as claimed in claim 3, wherein means is provided for positively locking the screw threaded engagement between the sleeve and termination.

6. An overhead electric and optical transmission system as claimed in claim 2 or 3, wherein the means electrically connecting the sleeve to the electric jumper cable comprises a separately formed lug which is permanently secured to the sleeve.

7. An overhead electric and optical transmission system of the kind in which at least one overhead electric conductor has, loosely housed in an elongate compartment in a central core, at least one optical fibre, in which system at least one said overhead electric conductor is mechanically secured to a tower through at least one electric insulator by means of a dead end fitting comprising a sleeve of malleable metal or metal alloy, open at each of its ends, and compression jointed at one end to the overhead electric conductor to such an extent that the central core of the overhead conductor is not so distorted that there is risk of damage to the or any optical fibre loosely housed in the elongate compartment in the central core; a separately formed termination of metal or metal alloy of high mechanical strength which, over a part of its length at one of its ends, is of generally tubular form and is in screw threaded engagement with an end of the sleeve and which, at the other of its ends is in the form of a clevis which is secured to said electric insulator; and, effecting electrical connection to an electric jumper cable, a separately formed lug which is permanently secured to the sleeve, a part of the lug engaging in a notch in the adjacent edge of the termination to positively lock the screw threaded engagement between the sleeve and termination.

* * * * *